Feb. 13, 1968     M. L. BACOW     3,369,247
RADIO ANTENNA MOUNTING BRACKET FOR VEHICLES
Filed Nov. 2, 1964
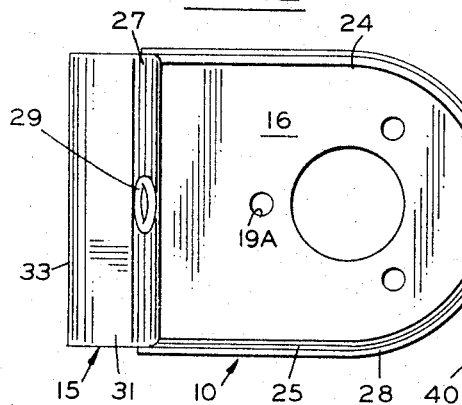
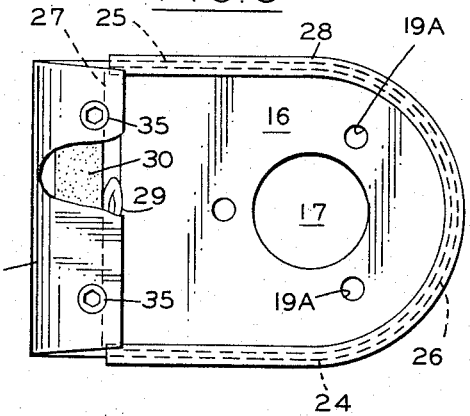
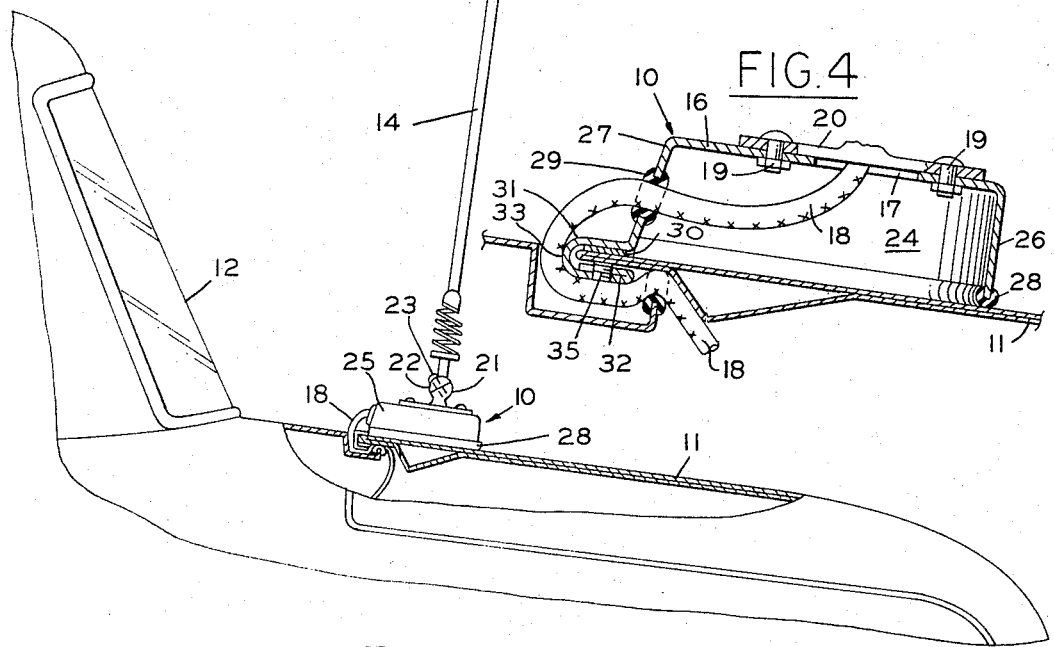
INVENTOR
MITCHELL L. BACOW
BY *Hill P. Sewald*
ATTORNEY United States Patent Office 3,369,247
Patented Feb. 13, 1968

3,369,247
RADIO ANTENNA MOUNTING BRACKET FOR VEHICLES
Mitchell L. Bacow, 34 Cherokee Drive,
Pontiac, Mich. 48053
Filed Nov. 2, 1964, Ser. No. 407,982
1 Claim. (Cl. 343—888)

ABSTRACT OF THE DISCLOSURE

A mounting bracket for long heavy radio sending antennas mountable on the deck lid of a vehicle with an anti-scratch pad therebetween including a hollow body compressible against the pad and deck and a connecting portion leading around and under the edge of the deck with concealed screws for securing and electrically connecting the bracket to the vehicle so that the device is mountable and dismountable without making holes in the deck and usable without marring the deck and providing a cavity in the hollow body for electrical cables and an aperture in the body for leading a cable therethrough.

---

This invention relates to radio antenna mounting brackets and in particular pertains to a bracket which is mountable on a metal panel such as an automobile trunk lid, motor hood, or top without the necessity of drilling holes in the automobile panels so that bracket and antenna may be mounted without making attaching holes and may be removed without leaving previously made attaching holes in the automobile panel.

Various types of mounting brackets have been employed in the prior art such as those attached to the vehicle bumper and those secured in an aperture in a sheet metal panel of an automobile, however, the several devices of the prior art have not proven entirely satisfactory in that the bumper mounting does not place the antenna over the car body thereby losing ground effect and whereby the brackets necessitating apertures in the automobile panel require the additional work of making apertures in the panel and, then upon removal of the bracket, necessitate filling in, welding, and painting the panel.

With the foregoing in view, the primary object of the invention is to provide a radio antenna mounting bracket which may be secured on a panel of an automobile or other metal panel without making attaching apertures in the panel.

An object of the invention is to provide a mounting bracket which may be used with any type of antenna.

An object of the invention is to provide a mounting bracket that has cushion pads or strips for protecting the finish and surface of an automobile panel.

An object of the invention is to provide a mounting bracket having an attaching flange which fits on the bottom of a panel and which is tightened thereagainst with metal screws or bolts effecting the attachment of the bracket and also effecting an electrical connection thereby grounding the bracket to the panel.

An object of the invention is to provide an antenna mounting bracket for metal panels which is simple in design and construction, inexpensive to manufacture, easy to use and mount, and easy to dismount and remove without spoiling the surface of the panel.

These and other objects of the invention will become apparent by reference to the following description of an antenna bracket embodying the invention taken in connection with the accompanying drawing in which:

FIG. 1 is a side elevational view of the bracket supporting an antenna and showing the panel mounting of the bracket on the panel in cross-section and partially showing an automobile.

FIG. 2 is an enlarged top plan view of the mounting bracket of FIG. 1.

FIG. 3 is a bottom plan view of the mounting bracket seen in FIG. 2, and

FIG. 4 is an enlarged cross-sectional view of the mounting bracket and adjacent panels seen in FIG. 1.

Referring now to the drawing wherein like numerals refer to like and corresponding parts throughout several views, the bracket 10 may be superposed on the deck lid panel 11 of an automobile 12. An antenna 14 is secured to the bracket 10. The bracket 10 rests on the deck lid 11 and is attached thereto by a mounting flange 15 which fixedly secures the bracket 10 on the deck lid 11.

More particularly, the bracket 10 comprises a top wall 16 including means for attachment to the antenna 14. The attachment means may comprise a central aperture 17 for receiving a cable 18 and side apertures for receiving the bolts 19. The antenna flange 20 is bolted on the top wall 16 and supports one-half 21 of a ball joint. The other half 22 of the ball joint is secured to the fixed half 21 by an adjusting screw 23. Thus by turning the ball half 22 relative to the fixed half 21 and securing them with the adjusting screw 23 the angulation of the antenna 14 may be adjusted as desired. Thus the bracket 10 may lie in any plane or at any angle to suit the contour of the panel and angle of the panel on which it is mounted.

Side walls 24, 25, 26, and 27 depend below the top wall 16 and are attached thereto. These side walls 24–27 have bottom edges for bearing on the panel such as the deck lid 11. A protective strip grommet 28 envelops the bottom edges of the side walls 24, 25, and 26 and protects the surface and finish of the deck lid or panel 11.

The side wall 27 may be considered a face wall and is equipped with an aperture and a grommet 29 through which the cable 18 leads to the interior of the vehicle for connection to the radio.

A mounting flange extends from the face wall 27 and may be substantially U-shaped in cross-section having a top bar 31, a bottom bar 32, and an inter-connecting U-shaped portion 33. A resilient or protective pad 30 is disposed between the top bar 31 and the surface of the deck lid or panel 11. The connecting means or flange 15 has a sidewise opening channel formed by the bars 31 and 32 and the inter-connecting web 33 and this channel receives the projecting end of the deck lid or panel 11.

The bottom bar 32 is equipped with threaded apertures. Bolts or screws 35 are threaded in the apertures of the bottom bar 32. The bolts 35 are tightened against the bottom surface of the deck lid 11 and form an electrical connection between the bracket 10 and the automobile body. The bracket 10 is preferably made as shown in FIGS. 2 and 3 and in the drawing wherein the attaching means or flange 15 extends outwardly from the base side 27. However, it is within the purview of the invention to have the attaching means or flange 15 depend below the body of the bracket 10 so as not to extend forwardly of the face side wall 27. However, it has been found that with the attaching means or a flange 15 extending outwardly from the face side wall 27, that the bracket can be mounted on the trunk lid and the trunk lid moved from a closed to an open position without the face wall 27 of the bracket 10 interfering with the hinge portion of the automobile.

In using the device of the invention the antenna 14 is attached to the bracket 10 as shown in FIGS. 1 and 4. The bracket 10 attaching flange 15 is then slipped around the edge of the panel or deck lid 11. The deck lid is then opened or the panel elevated and the attaching screws 35 are tightened against the bottom surface of the panel or deck lid 11. This completely mounts the antenna quickly and securely on the deck lid 11 or other panel.

The rear deck of the vehicle has a relatively large peripheral channel and the deck lid has a flange which is received in the channel in relatively wide spaced relationship with the space between sealed by a resilient compressible sealing strip or grommet. The space between the deck channel and the lid flange easily receives the bottom bar 32 and the U-shaped portion 33 as well as the cable 18. The lid 11 is pivoted below the deck opening so as to advance towards the deck as a cover and there is no pinching pivotal action between the deck and the lid 11. In some models of the device the aperture and grommet 29 are on a side wall 24 or 25 to lead the cable 18 at a large angle between the deck and the lid 11. In some models of the device the aperture and grommet 29 are on a side wall 24 or 25 to lead the cable 18 at a large angle between the deck and lid but this is solely to eliminate sharp angles in the cable as the spacing of the vehicle parts is adequate to receive both the device and the cable.

Depending on the contour or angulation of the deck lid or panel 11, the ball halves 21 and 22 may be rotated relative to one another and the adjusting screw 23 secured to locate the antenna 14 at the desired angle. The cable 18 may be lead through the hinge portion of the deck lid to the interior of the vehicle and connected to the radio.

In operation, with the automobile moving, windage on the antenna and the coil 40 tends to force the antenna 14 to bend rearwardly. This stress is directed downwardly on the back wall 26 of the mounting bracket and upwardly on the attaching flange 15. It is therefore obvious that the mounting bracket has leverage-wise advantage in supporting the antenna 14 and coil 40 under heavy wind conditions and at high speeds.

The mounting bracket enables the user to mount the antenna 14 above the car body so that when the windage occurs while using the vehicle, the antenna 14 and coil 40 are over the vehicle producng a suitable electrical ground effect which increases the efficiency of the radio system. Whereas, if the antenna 14 were mounted on the rear bumper, the antenna under windage conditions would merely lead backwardly from the car and produce no electrical ground effect relative to the metal of the car body.

The use may therefore mount the antenna 14 and bracket 10 at any place he desires on the vehicle including the front hood or the top panels of the vehicle. He may make trial installations to get the best effect in broadcast and receiving with several mountings as mounting and dismounting is done quickly and easily and without making objectionable apertures in the sheet metal of the vehicle.

Although but a single embodiment of the invention has been shown and described in detail, it is obvious that many changes may be made in the size, shape, detail, and arrangement of the various elements of the invention within the scope of the appended claims.

I claim:

1. A quickly and easily demountably-mountable strong and dependable support bracket capable of resisting acceleration forces and leverage forces particularly suitable for use on an automobile for mounting a relatively long and heavy radio sending antenna thereon without the necessity of drilling holes in the body panels and for dismounting the bracket without the necessity of filling in holes previously made in panels in mounting an antenna comprising, an antenna mounting body portion, and
an automobile panel inter-connecting, gripping, and electrically grounding portion on said body portion;
said body portion comprising a top wall having suitable means such as apertures for receiving and connectably mounting a radio antenna,
depending side walls on said body inter-connected with said top wall;
said side walls having bottom edges for bearing against an automobile panel,
a resilient anti-scratch strip member at said side wall bottom edges for protectively cushioning said side wall bottom edges relative to an automobile panel;
said pad and side walls when said body is positioned on an automobile panel spacing said body top wall above an automobile panel creating a space therebelow inclosed by said sidewalls as a cavity for receiving antenna connecting means and electrical lead wires one said sidewall havng an aperture for leading electrical lead wires from the inclosed cavity of said body;
one of said side walls on said body being a face wall;
a U-shaped flange at said face wall having a top leg bar for bearing on the top surface of an automobile panel, a bottom leg bar for bearing on the bottom surface of an automobile and; a reversely curved inter-connecting web;
said reversely curved substantially U-shaped flange on said face wall depending below said side wall bottom edges and said pad, and having a sidewise opening channel formed by said top and bottom leg bars;
said flange channel opening toward said face wall relative to said body;
a protective layer of cushion material on said top leg bar to protect the top surface of an automobile panel over which said top leg bar is positioned; and
securing screws threaded in said bottom leg bar for engaging the bottom surface of an automobile panel to fix said mounting bracket relative to an automobile panel and to establsh electrical contact between said bracket and an automobile panel to ground said bracket and an antenna secured thereto;
said device making electrical ground connection to a vehicle for an antenna in spite of being insulated by said anti-scratch cushion material and placing acceleration and leverage forces exerted by an antenna directly against a vehicle deck lid in compression thereby substantially reducing torsion and sheer forces in the body portion and in the gripping portion of the device.

References Cited
UNITED STATES PATENTS

| 1,296,866 | 3/1919 | Skretting | 248—43 |
| 1,995,574 | 3/1935 | Metz | 248—226.5 |
| 3,056,570 | 10/1962 | Slavin | 343—715 |

FOREIGN PATENTS

| 1,203,227 | 7/1957 | France. |

HERMAN KARL SAALBACH, *Primary Examiner.*

ELI LIEBERMAN, *Examiner.*

PAUL L. GENSLER, *Assistant Examiner.*